(12) United States Patent
Weeks et al.

(10) Patent No.: US 9,296,437 B2
(45) Date of Patent: Mar. 29, 2016

(54) ROLLER COLLAR CONFIGURED TO REDUCE SEAL PACKING

(71) Applicant: Caterpillar, Inc., Peoria, IL (US)

(72) Inventors: Allen Jay Weeks, Morton, IL (US);
Jeffrey Scott VanderVeen, Peoria, IL (US); Eric Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 560 days.

(21) Appl. No.: 13/667,917

(22) Filed: Nov. 2, 2012

(65) Prior Publication Data

US 2014/0125117 A1   May 8, 2014

(51) Int. Cl.
*B62D 55/15*   (2006.01)

(52) U.S. Cl.
CPC ..................... *B62D 55/15* (2013.01)

(58) Field of Classification Search
CPC ...... B62D 55/088; B62D 55/15; B62D 55/14; B62D 55/092
USPC .......... 305/100, 107, 117, 119, 136, 138, 139
See application file for complete search history.

(56) References Cited

U.S. PATENT DOCUMENTS

| | | | | |
|---|---|---|---|---|
| 3,843,214 A * | 10/1974 | Piepho | | 305/119 |
| 3,861,762 A * | 1/1975 | Freedy et al. | | 305/100 |
| 3,913,985 A * | 10/1975 | Orr et al. | | 305/107 |
| 4,351,533 A * | 9/1982 | Moore | | 384/481 |
| 5,713,644 A * | 2/1998 | Freeman | | 305/110 |
| 6,019,443 A * | 2/2000 | Freeman | | 305/110 |
| 6,231,136 B1 * | 5/2001 | Freeman | | 305/107 |
| 6,435,629 B1 * | 8/2002 | Egle et al. | | 305/136 |
| 6,457,786 B1 * | 10/2002 | Maguire | | 305/136 |
| 6,481,807 B1 * | 11/2002 | Barani et al. | | 305/100 |
| 6,874,859 B1 * | 4/2005 | Duse | | 305/136 |
| 7,370,865 B2 * | 5/2008 | Vik et al. | | 277/380 |
| 8,979,219 B2 * | 3/2015 | Hisamatsu | | 305/136 |
| 2006/0181147 A1 * | 8/2006 | Vik et al. | | 305/103 |
| 2011/0121643 A1 * | 5/2011 | Mulligan | | 305/136 |
| 2012/0146397 A1 * | 6/2012 | Hisamatsu | | 305/100 |
| 2012/0152573 A1 | 6/2012 | May | | |

FOREIGN PATENT DOCUMENTS

WO  WO 2011125761 A1 *  10/2011  .............. B62D 55/14

OTHER PUBLICATIONS

Caterpillar Inc.; *D7E Track-Type Tractor*; specalogue; 2010; pp. 1-16.
Caterpillar Inc.; *D7R Series 2 Track-Type Tractor*; specalogue; 2007; pp. 1-24.

* cited by examiner

*Primary Examiner* — Kip T Kotter
(74) *Attorney, Agent, or Firm* — Miller, Matthias & Hull LLP

(57) ABSTRACT

A roller collar is provided in a roller assembly of a machine, such as a track carrier roller of a track-type undercarriage. The roller assembly includes a roller mounted on a shaft and having a seal retaining lubricant between the roller and the shaft. The collar and an inner surface of the roller form a seal cavity placing the seal in fluid communication with an ambient atmosphere surrounding the roller. The roller collar extends over an opening into the seal cavity, such as with an outwardly extending flange or teeth or with an outer surface configured to increase a distance to be traveled to enter the seal cavity, and to reduce the amount of abrasive material entering the seal cavity and potentially compromising the integrity of the seal.

5 Claims, 10 Drawing Sheets

ROLLER COLLAR CONFIGURED TO REDUCE SEAL PACKING

TECHNICAL FIELD

This disclosure relates generally to machines having track-type undercarriages and, in particular, to track carrier rollers in such machines having seal packing guards to impede compaction of material within the seal cavity of the carrier roller.

BACKGROUND

Track-type machines are used in a wide variety of rugged service environments. The use of ground engaging tracks rather than wheels can provide enhanced traction, stability, and robustness to a machine system over what might otherwise be available. A typical undercarriage system in a track-type machine includes a plurality of track shoes coupled together in an endless track chain by way of a set of track links, and extending about a drive sprocket and one or more rotatable idlers. The track assembly provides better mobility on uneven ground and typically renders excellent traction while spreading the weight of the machine over a large area. Mining, construction, landfills, forestry, and still other service environments are notable examples of where track-type machines are advantageously used.

During operation, the movement of the track-type machine typically causes the track assemblies to pick up dirt and debris or any outlying material as it makes contact with the ground, only to have the material deposited on the track frame and subsequently on the other components of the track-type machine. In these environments, and particularly in landfills, abrasive materials are present at most worksites where track-type machines are used. This may result in an increased machine weight, more friction forces between the moving components in the track assemblies and increased machine wear. Wear is generally caused as the accumulated material results in an abrasive action on the components of the machine.

One area where such accumulation occurs is in the seal cavities of rotating components such as carrier rollers, track rollers, idler rollers, sprockets and the like, all of which may be encompassed by the term "roller" as used herein. As one example, carrier rollers extend above the track frame and support the track chain between the sprocket and an idler roller to prevent slack in or sagging of the track chain. Carrier rollers are typically supported by a carrier stand extending from the track frame and an axle or shaft extending from the carrier stand. Oil, grease or other lubricants disposed in a space between a carrier roller and its shaft reduce friction between the components. Annular or toroidal seals, such as O-rings, may be used to retain the lubricant in the space, but a seal cavity may place the seals in fluid communication with the ambient atmosphere surrounding the carrier roller. When operating in the environments described above, abrasive material may accumulate in the seal cavity and eventually displace the seal or abrade the seal resulting in the loss of lubricant and ultimate failure of the carrier roller. In some environments, refuse such as trash bags and other plastic bags, wire, video cassette tape and the like can enter the cavity wrap around the seals. In view of these situations, a need exists for an improved configuration of the track carrier roller that prevents or, at a minimum, retards the accumulation of abrasive material in the seal cavity of the roller.

SUMMARY OF THE DISCLOSURE

In one aspect of the present disclosure, a roller assembly is disclosed. The roller assembly includes a roller shaft and a roller rotatably mounted on the roller shaft with a first end of the roller shaft extending beyond an outward surface of the roller. The roller and the roller shaft define a lubricant reservoir there between, and with the outward surface of the roller defining an outward rim of the roller, wherein the outward rim comprises an annular inner surface having at least two inner diameter portions having decreasing inner diameters for each of the at least two inner diameter portions as the annular inner surface extends inwardly from the outward surface of the roller. The roller assembly further includes an annular seal disposed proximate the first end of the roller shaft and between the roller and the roller shaft and forming a substantially water-tight seal of the lubricant reservoir, and an annular collar disposed on the first end of the roller shaft and received in the outward rim of the roller. The annular collar includes an annular outer surface having at least two outer diameter portions having decreasing outer diameters for each of the at least two outer diameter portions as the annular outer surface extends inwardly from an annular outer surface of the annular collar, wherein each of the at least two outer diameter portions of the annular outer surface corresponds to one of the at least two inner diameter portions of the annular inner surface of the outward rim, and the outward rim of the roller and the annular outer surface of the annular collar define a seal cavity placing the annular seal in fluid communication with an ambient atmosphere surrounding the roller.

In another aspect of the present disclosure, a roller assembly is disclosed. The roller assembly includes a roller shaft, a roller rotatably mounted on the roller shaft with a first end of the roller shaft extending beyond an outward surface of the roller, with the roller and the roller shaft defining a lubricant reservoir there between, and with the outward surface of the roller defining an outward rim of the roller, wherein the outward rim comprises an annular inner surface. The roller assembly further includes an annular seal disposed proximate the first end of the roller shaft and between the roller and the roller shaft and forming a substantially water-tight seal of the lubricant reservoir, and an annular collar disposed on the first end of the roller shaft and received in the outward rim of the roller. The annular collar includes an annular outer surface, wherein the annular outer surface of the annular collar and the annular inner surface of the outward rim define a seal cavity placing the annular seal in fluid communication with an ambient atmosphere surrounding the roller, and a flange extending radially outward from the annular outer surface of the annular collar beyond the seal cavity and over the outward surface of the roller.

In a further aspect of the present disclosure, a roller assembly is disclosed. The roller assembly includes a roller shaft, a roller rotatably mounted on the roller shaft with a first end of the roller shaft extending beyond an outward surface of the roller, the roller and the roller shaft defining a lubricant reservoir there between, and with the outward surface of the roller defining an outward rim of the roller, wherein the outward rim comprises an annular inner surface, an annular seal disposed proximate the first end of the roller shaft and between the roller and the roller shaft and forming a substantially water-tight seal of the lubricant reservoir, and an annular collar disposed on the first end of the roller shaft and received in the outward rim of the roller. The annular collar includes an annular outer surface, wherein the annular outer surface of the annular collar and the annular inner surface of the outward rim define a seal cavity placing the annular seal in fluid communication with an ambient atmosphere surrounding the roller, and a plurality of teeth circumferentially spaced about the annular outer surface of the annular collar and extending outwardly from the annular outer surface of the annular collar past a gap between the annular outer surface of the annular collar and the annular inner surface of the outward rim.

Additional aspects are defined by the claims of this patent.

DETAILED DESCRIPTION

Although the following text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
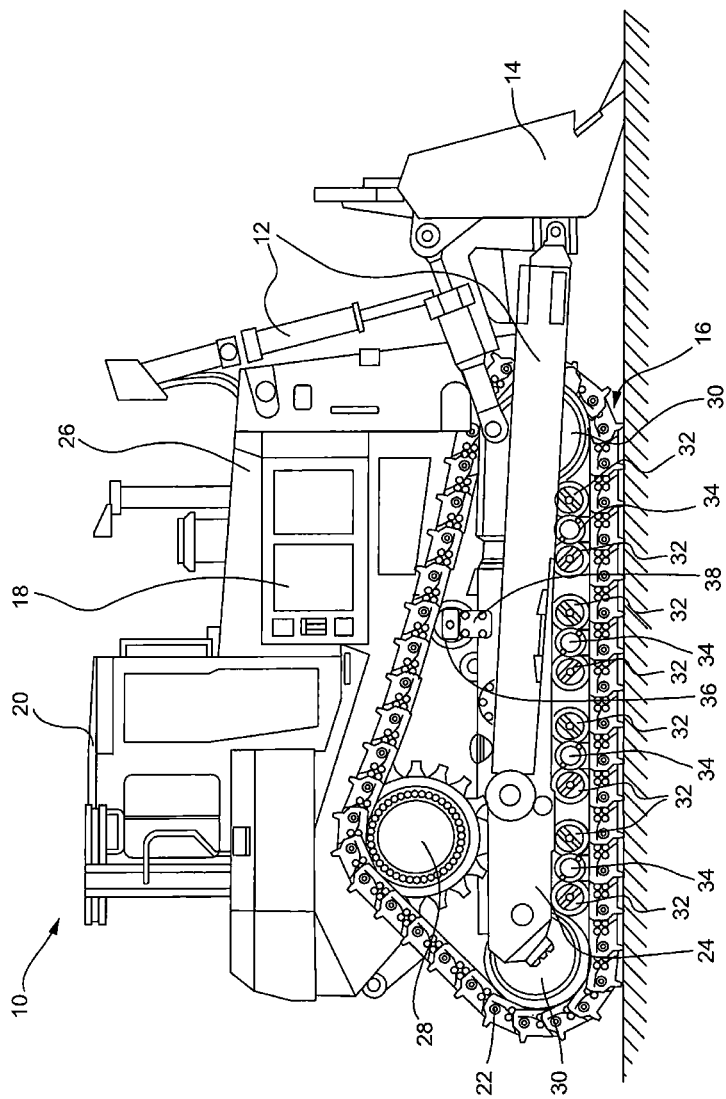
FIG. 1 is a side elevation view of a track-type machine having a track carrier roller in accordance with the present disclosure.

Referring to FIG. 1, a track-type machine 10 may embody a mobile machine that performs some type of operation associated with an industry such as mining, construction, farming, transportation, waste handling or any other industry known in the art. For example, the machine 10 may be an earth moving machine such as a track-type tractor or other suitable machine. The machine 10 may include an implement system 12 configured to adjust the position or orientation of an implement such as a tractor blade 14, a drive system in the form of a track undercarriage 16 for propelling the machine 10, a power source 18 that provides power to the implement system 12 and the undercarriage 16, and an operator station 20 for operator control of the implement system 12 and the undercarriage 16. Though a track-type tractor is illustrated, the packing guards and collars disclosed herein may be implemented in any other types of machines having an undercarriage, such as material loaders, excavators and the like.

Power source 18 may embody an engine such as, for example, a diesel engine, a gasoline engine, a gaseous fuel-powered engine or any other type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic or pneumatic power for moving the implement system 12, and converted into drive torque by an appropriate power transmission assembly (not shown) to drive a track 22 of the undercarriage 16.

The undercarriage 16 may be a standard track drive system known in the art and includes a roller frame 24 connected to a body 26 of the machine 10 and having a drive sprocket 28 and one or more idler pulleys 30 pivotally connected thereto. The track 22 is supported by the sprocket 28 and idler pulleys 30, but may not be taught so that the track 22 may move to provide stability for the machine 10 as it traverses uneven terrain. Pairs of track rollers 32 pivotally connected to the roller frame 24 by bogies 34 support the machine 10 and absorb vibrations as the machine 10 travels over the uneven terrain. Above the roller frame 24, the portion of the track 22 between the sprocket 28 and front idler pulley 30 is supported by at least one carrier roller 36. The carrier roller 36 is rotatably mounted to a carrier stand 38 extending upwardly from the roller frame 24 so that the carrier roller 36 rotates as the track 22 moves between the sprocket 28 and the idler pulley 30. The undercarriage 16 illustrated herein is an elevated sprocket-type undercarriage, but those skilled in the art will understand that the concepts disclosed herein may be implemented in other types of undercarriage such as low sprocket undercarriages having a sprocket 28 and a single idler pulley 30.

Figure 2:
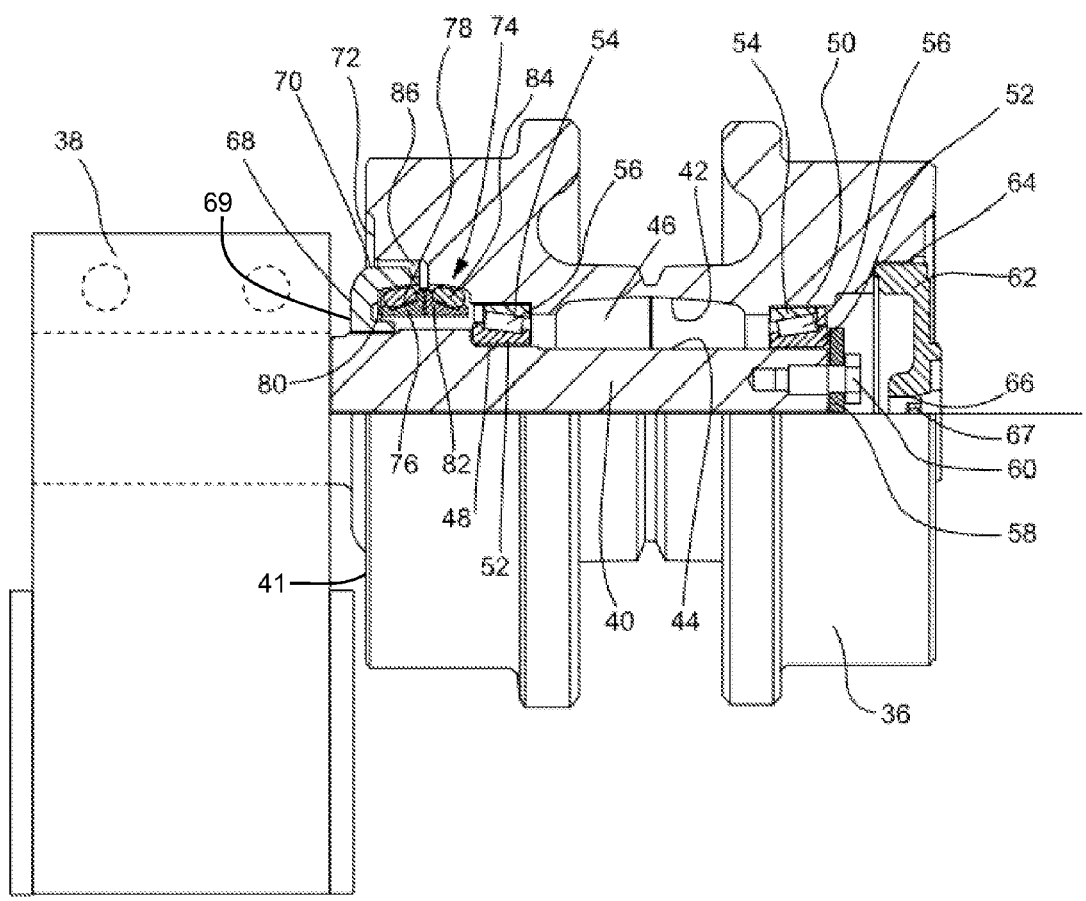
FIG. 2 is a partial sectional side view of a track carrier roller of the machine of FIG. 1.

FIG. 2 illustrates an example of the carrier roller 36 for which seal packing guards in accordance with the present disclosure may be implemented. This implementation of the seal packing guards and collars in the carrier roller 36 is exemplary only. The seal packing guards and collars in accordance with the present disclosure may be implemented in other rotating components mounted on a shaft, such as track rollers, idler pulleys, sprockets and the like, that collectively are encompassed by the term "roller." The carrier roller 36 is rotatably mounted to the carrier stand 38 by an axial roller shaft or axle 40 extending out of the carrier roller 36 beyond a roller outward surface 41 of the carrier roller 36 and received and retained by the carrier stand 38. The roller outward surface 41 may be an axially outermost surface of the carrier roller 36 and may be perpendicular to the roller shaft 40. The carrier stand 38 engages the roller shaft 40 to prevent rotation of the roller shaft 40 relative to the carrier stand 38 as the carrier roller 36 rotates about the roller shaft 40. The carrier roller 36 is illustrated and described with the cantilevered shaft 40, but rollers or other components in which seal packing guards and collars are implemented may have the shaft 40 extend out of both sides of the roller 36 and be dually supported by the roller frame 24 or other frame of the machine 10.

Portions of an inner surface 42 of the carrier roller 36 and an outer surface 44 of the roller shaft 40 define a lubricant reservoir 46 there between in which a lubricant such as oil or grease is disposed to lubricate the moving components of the carrier roller 36. The carrier roller 36 is rotatably mounted to the roller shaft 40 by bearings, such as a pair of thrust bearings 48, 50. Each thrust bearing 48, 50 may have an inner race 52 mounted on the outer surface 44 of the roller shaft 40, an outer race 54 mounted to the inner surface 42 of the carrier roller 36 for rotation there with, and a plurality of tapered roller bearings 56 allowing relative movement of the outer races 54 with respect to the inner races 52 and allowing the thrust bearings 50 to bear radial and thrust loads that occur as the track 22 moves over the carrier roller 36. The surfaces 42, 44 and a race lock plate 58 connected to an end of the roller shaft 40 by fasteners 60 are configured to engage the inner races 52 and the outer races 54 to maintain radial alignment of the pairs of inner races 52 and outer races 54.

The lubricant reservoir 46 is closed and sealed at one end by an end cap 62 received in a first outward rim 64 of the inner surface 42 of the carrier roller 36. The end cap 62 and the first outward rim 64 engage to form a substantially water-tight seal to prevent leakage of the lubricant from the reservoir 46. The end cap 62 includes a fill hole 66 and corresponding fill plug 67 that can be removed to replenish the lubricant in the reservoir 46.

The opposite end of the lubricant reservoir 46 is closed by an annular collar 68 in combination with an appropriate seal mechanism for forming a seal between two components moving relative to each other. The annular collar 68 may have a collar outward surface 69 with a circular opening having an inner diameter dimensioned to correspond with an outer diameter of a corresponding portion of the outer surface 44 of the roller shaft 40. The collar outward surface 69 may be an axially outermost surface of the annular collar 68 and may be perpendicular to the roller shaft 40 when mounted thereon. The collar 68 may also have a generally cylindrical outer surface 70 having an outer diameter dimensioned smaller than an inner diameter of a corresponding second outward rim 72 of the carrier roller 36 to create a gap there between.

As shown in FIG. 2, the seal at the collar 68 and outward rim 72 may be a stationary metal face seal set 74. The seal set 74 may have an outward portion with a first annular seal block 76 mounted on the outer surface 44 of the roller shaft 40, and a first annular or toroidal seal 78 disposed between the first seal block 76 and a cylindrical inner surface 80 of the collar 68 to form a substantially water-tight seal there between. The seal set 74 also has a complementary inward portion with a second annular seal block 82 mounted to the outer surface 44 of the roller shaft 40 inward of the first seal block 76, and a second annular or toroidal seal 84 disposed between the second seal block 82 and a corresponding portion of the inner surface 42 of the carrier roller 36 to form a substantially water-tight seal there between to prevent lubricant from the reservoir 46 from leaking into an annular seal cavity 86 defined by the outer surface 70 of the collar 68 and the second outward rim 72 of the carrier roller 36.

As will be apparent from FIG. 2, the seal cavity 86 opens to the exterior of the carrier roller 36 and places the seal set 74 in fluid communication with the ambient atmosphere surrounding the carrier roller 36. During use of the machine 10 in environments such as landfills having dust and loose abrasive materials, debris is churned up by the tracks 22 and can enter the seal cavities 86 of the carrier rollers 36. Over time, material accumulates in the seal cavity 86 and becomes compacted. The compacted material eventually traverses the seal cavity 86 and engages the seals 78, 84 of the seal set 74. Over time, the compacted material can displace the seals 78, 84 or abrade the seals 78, 84, resulting in leaks of lubricant and ultimately to the failure of the carrier roller 36.

Figure 3:
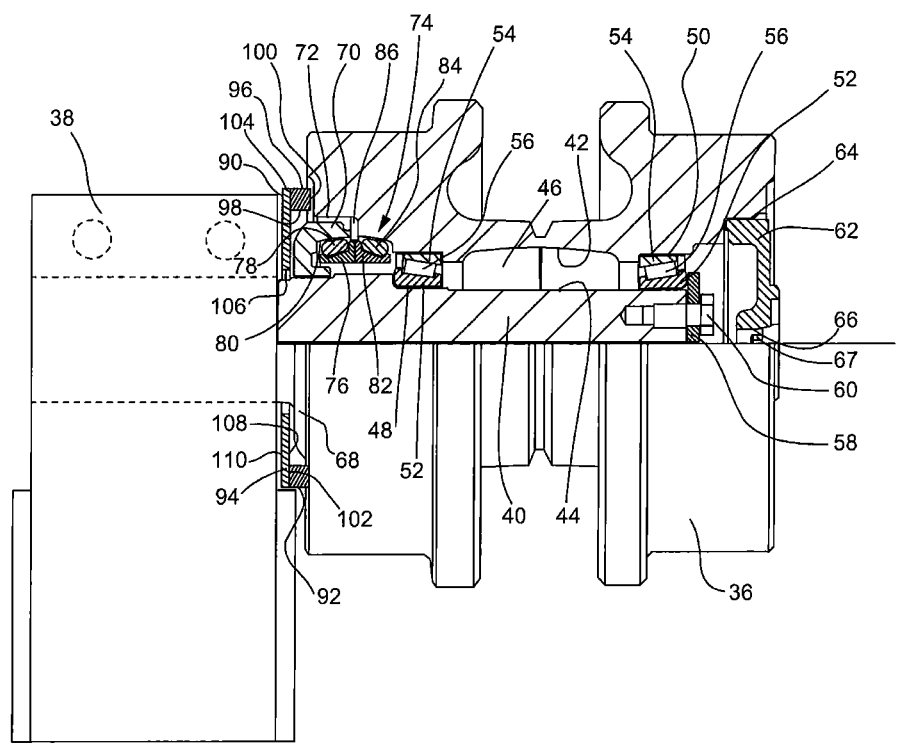
FIG. 3 is a partial sectional side view of a track carrier roller of FIG. 2 with a first embodiment of a seal packing guard in accordance with the present disclosure.

FIG. 3 illustrates the carrier roller 36 as described above provided with an embodiment of an annular seal packing guard 90 in accordance with the present disclosure that retards the build-up of compacted material in the seal cavity 86. The seal packing guard 90 shown in FIG. 3 includes a first annular guard portion 92 connected to the second outward rim 72 of the carrier roller 36, and a second annual guard portion 94 connected to the first annular guard portion 92 opposite the carrier roller 36. The first guard portion 92 includes an annular outer surface 96 having an outer diameter and an annular inner surface 98 having an inner diameter that is greater than the outer diameter of the outer surface 70 of the collar 68 so that the first guard portion 92 does not engage the collar 68 as the carrier roller 36 rotates about the roller shaft 40. An inward surface 100 of the first guard portion 92 faces and engages the outward rim 72 and is secured thereto by welds, adhesive or other appropriate fastening mechanisms. An outward surface 102 of the first guard portion 92 is disposed opposite the inward surface 100, with the first guard portion 92 having a thickness that extends the outward surface 102 axially beyond the collar 68.

The second guard portion 94 includes an annular outer surface 104 having an outer diameter that is approximately equal to the outer diameter of the outer surface 96 of the first guard portion 92 so that the outer surfaces 96, 104 are approximately aligned. An annular inner surface 106 has an inner diameter that is smaller than the outer diameter of the outer surface 70 of the collar 68 so that the second guard portion 94 overlays the seal cavity 86, and the inner diameter is larger than an outer diameter of a corresponding portion of the outer surface 44 of the roller shaft 40 so that the inner surface 106 does not engage the roller shaft 40 as the carrier roller 36 rotates about the roller shaft 40. An inward surface 108 of the second guard portion 94 faces and engages the outward surface 102 of the first guard portion 92 and is secured thereto by welds, adhesive or other appropriate fastening mechanisms. An outward surface 110 of the second guard portion 94 is disposed opposite the inward surface 108, with the second guard portion 94 having a thickness that preserves a gap between the seal packing guard 90 and the carrier stand 38 so that the carrier roller 36 and seal packing guard 90 are free to rotate about the roller shaft 40.

The annular guard portions 92, 94 of the seal packing guard 90 may be fabricated from any appropriate material that will withstand the impacts of the abrasive materials of the work environment without fracturing, wearing away due to erosion, or detach from the carrier roller 36. Though the seal packing guard 90 is illustrated and described herein as being formed from separate components in the guard portions 92, 94, the seal packing guard 90 may be fabricated as a single unitary component having dimensions as described above. The unitary seal packing guard 90 may be formed from any appropriate process such as stamping, forging, molding, casting and the like that is capable of forming the geometry of the seal packing guard 90 described herein.

Figure 4:
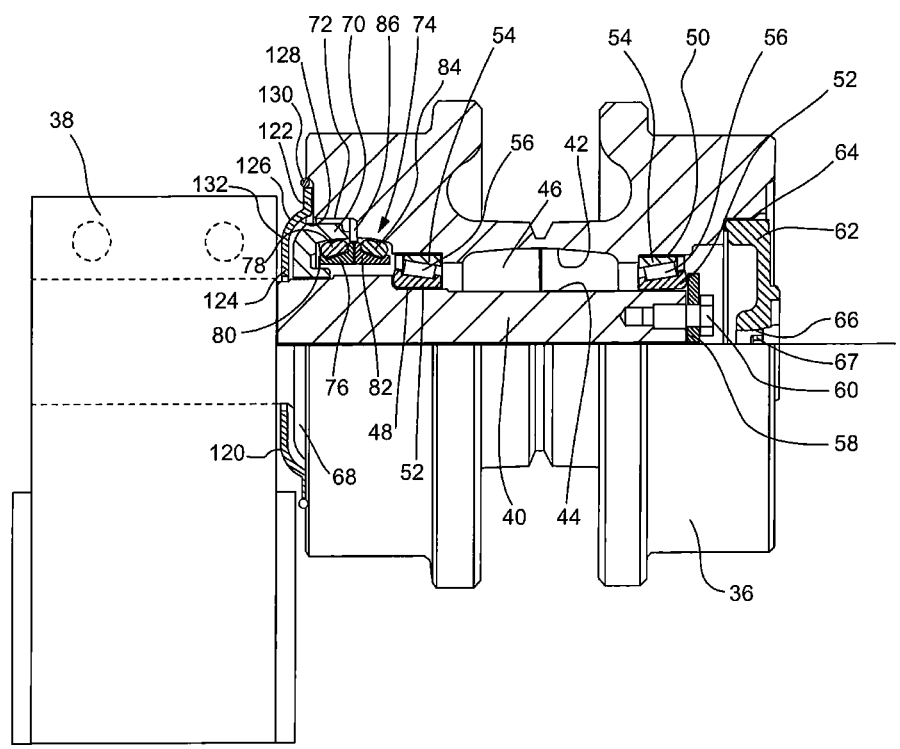
FIG. 4 is a partial sectional side view of a track carrier roller of FIG. 2 with an alternative embodiment of a seal packing guard in accordance with the present disclosure.

FIG. 4 illustrates an alternative embodiment of a seal packing guard 120 in accordance with the present disclosure. The seal packing guard 120 may be formed from a piece of stamped steel or other appropriate metal, and include a first annular plate 122, a second annular plate 124, and an intermediate transition or spacing portion 126. The first annular plate 122 of the seal packing guard 120 is shaped similar to a washer and has an outer diameter and an inner diameter that is greater than the outer diameter of the outer surface 70 of the collar 68 so that an inward surface 128 of the seal packing guard 120 does not engage the collar 68 as the carrier roller 36 rotates about the roller shaft 40. A portion of the inward surface 128 at the first annular plate 122 faces and engages the outward rim 72 and is secured thereto by welds 130, adhesive or other appropriate fastening mechanisms.

The second annular plate 124 of the seal packing guard 120 is also shaped similar to a washer and has an inner diameter that is larger than an outer diameter of a corresponding portion of the outer surface 44 of the roller shaft 40 so that the inner surface 106 does not engage the roller shaft 40 as the carrier roller 36 rotates about the roller shaft 40. At the same time, the inner diameter of the second annular plate 124 is smaller than the outer diameter of the outer surface 70 of the collar 68 so that the second annular plate 124 overlays the seal cavity 86 to at least partially shelter the seals 78, 84 from abrasive material. The second annular plate 124 is connected to the first annular plate 122 by the transition portion 126. The transition portion 126 is configured to extend beyond the collar 68 so that the portion of the inward surface 128 of the seal packing guard 120 at the second annular plate 124 overlays the collar 68 without engaging the collar 68. At the same time, a portion of an outward surface 132 of the seal packing guard 120 at the second annular plate 124 preserves a gap between the seal packing guard 120 and the carrier stand 38 so that the carrier roller 36 and seal packing guard 120 are free to rotate about the roller shaft 40.

The intermediate transition portion 126 as illustrated is shaped to generally conform to the outer contour of the collar 68 to maintain separation of the inward surface 128 from the collar 68. Those skilled in the art will understand that the portion 126 may have any other appropriate shape that will connect the second annular plate 124 to the first annular plate 122 in a manner that maintains the spacing of the seal packing guard 120 from the carrier stand 38, the roller shaft 40, and the collar 68. Moreover, though the annular plates 122, 124 and transition portion 126 are illustrated and described as being integrally formed from a single piece of metal in a stamping process, one or all of the portions 122-126 may be formed separately and later connected via any appropriate connection method to form the seal packing guard 120.

Figure 5:
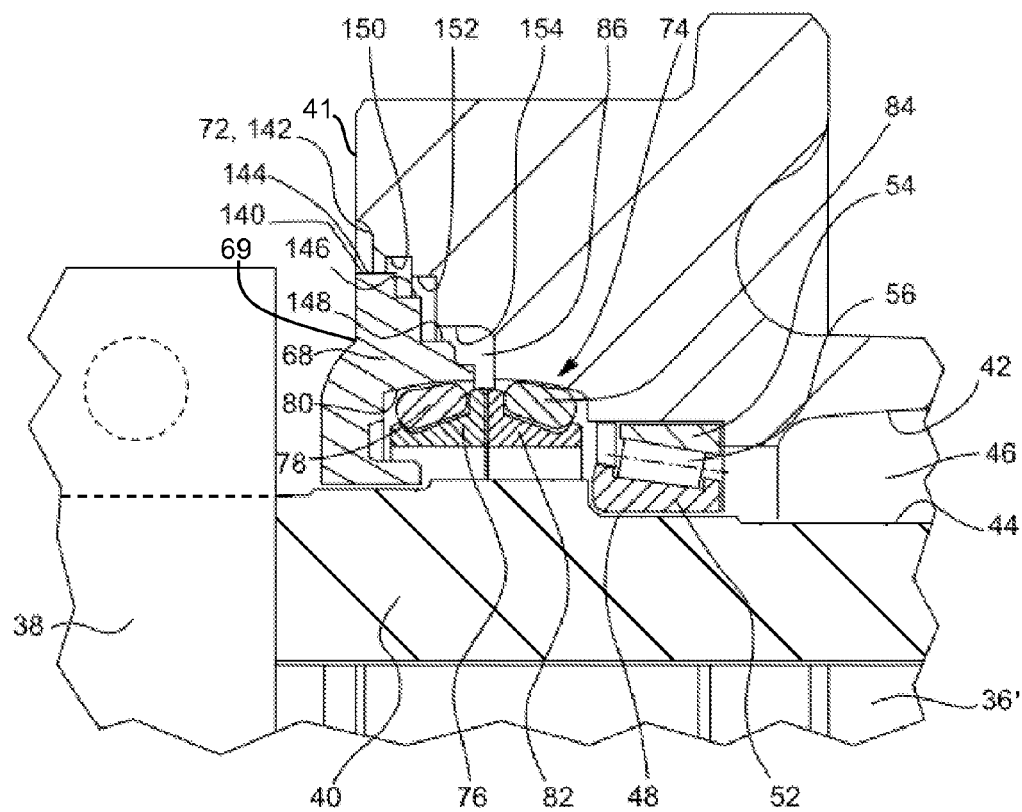
FIG. 5 is a partial sectional side view of an embodiment of a track carrier roller in accordance with the present disclosure for the machine of FIG. 1.

In addition or as an alternative to providing the seal packing guards 90, 120 to retard the accumulation of compacted material in the seal cavity 86, modifications may be made to a carrier roller 36' and the collar 68 to isolate the seal cavity 86 from the ambient atmosphere surrounding the carrier roller 36'. FIG. 5 illustrates one alternative embodiment of the carrier roller 36' and the collar 68 that increases the distance that the abrasive material must traverse to reach the seals 78, 84. In this embodiment, the geometries of an outer surface 140 of the collar 68 and the corresponding inner surface 142 defining the outward rim 72 are modified to form a labyrinth there between that must be traversed to enter the seal cavity 86. The outer surface 140 of the collar 68 may include a series of decreasing outer diameters as the outer surface 140 proceeds axially inwardly from the collar outward surface 69 into the carrier roller 36'. Consequently, the outer surface 140 may have a first outer diameter portion 144 extending inwardly from the collar outward surface 69 and having a largest outer diameter. The first outer diameter portion 144 transitions to a second outer diameter portion 146 having a smaller outer diameter than the first outer diameter portion 144, which then transitions into a third outer diameter portion 148 having a still smaller outer diameter.

To match the transitioning of the outer surface 140 of the collar 68 to smaller outer diameters, the inner diameter of the inner surface 142 of the outward rim 72 progressively decreases as it extends axially inwardly from the roller outward surface 41 and approaches the seal cavity 86 from the exterior of the carrier roller 36'. Consequently, the inner surface 142 has a first inner diameter portion 150 with an inner diameter that is greater than the outer diameter of the first outer diameter portion 144 of the outer surface 140 and extends axially inwardly by a greater distance than the first outer diameter portion 144. The first inner diameter portion 150 transitions to a second inner diameter portion 152 having an inner diameter smaller than the inner diameter of the first inner diameter portion 150 but greater than the outer diameter of the second outer diameter portion 146 of the outer surface 140. The second inner diameter portion 152 extends further axially inwardly than the second outer diameter portion 146 to a transition to a third inner diameter portion 154 having a still smaller inner diameter that the inner diameter of the second inner diameter portion 152. The third portions 148, 154 of the surfaces 140, 142, respectively, combine to define an entrance to the seal cavity 86.

The cooperating geometries of the outward rim 72 of the carrier roller 36' and the outer surface 140 of the collar 68 are exemplary, and other geometries functioning to increase the distance to be traversed by the abrasive material are contemplated. For example, the number of incremental decreases in the outer surface 140 may be increased or decreased from the three outer diameter portions 144-148 shown in FIG. 5, and the axial lengths of the portions 144-148 and 150-154 may be increased or decreased. The amount of change in the diameters of the surfaces 140, 144 may also be varied as desired. Moreover, whereas the transition regions between the portions 144-148 and 150-154 are shown as being generally planar and perpendicular to the roller shaft 40, the regions may be oriented at non-perpendicular angles relative to the roller shaft 40. The length of the labyrinth leading to the seal cavity 86 may further be increased by providing the transition surfaces with complimentary non-planar shapes, such as by providing recesses or grooves in the outer surface between the outer diameter portions 144-148 and corresponding ribs or ridges in the inner surface between the inner diameter portions 150-154, or vice versa. Such arrangements direct the abrasive material through non-linear paths while still allowing the collar 68 to be inserted into the outward rim 72 without the collar 68 and carrier roller 36' engaging to impede the rotation of the carrier roller 36'. Additional geometric configurations of the surfaces 140, 142 to retard or delay the flow of abrasive material to the seal cavity 86 will be apparent to those skilled in the art and are contemplated by the inventors as having use in carrier rollers 36' in accordance with the present disclosure.

Figure 6:
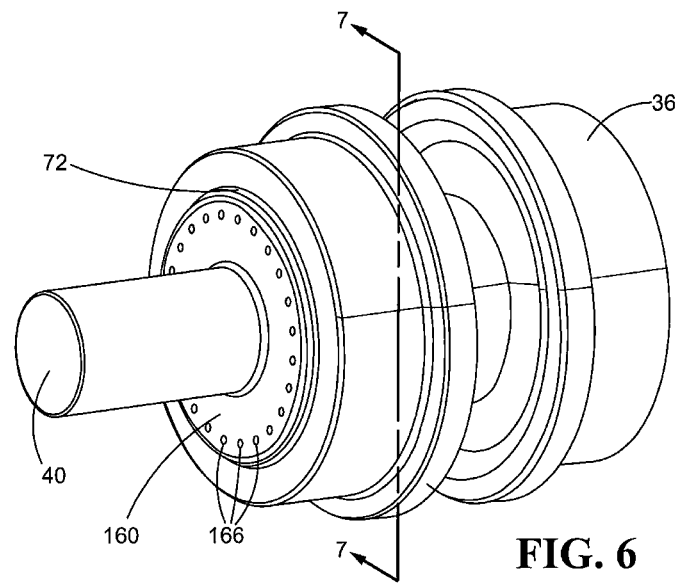
FIG. 6 is an isometric view of the track carrier roller of FIG. 2 with an alternative embodiment of a collar functioning as a seal packing guard.
Figure 7:
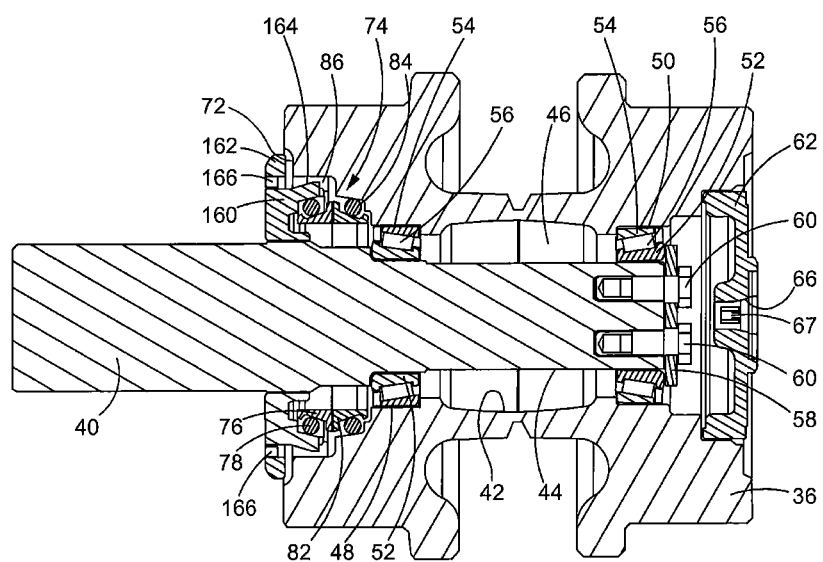
FIG. 7 is a cross-sectional view of the track carrier roller of FIG. 6 taken through line 7-7.

FIGS. 6 and 7 illustrate another alternative embodiment where the seal packing guard functionality is integrated into a modified collar 160 that restricts the flow of material into the seal cavity 86. The collar 160 includes a flange 162 extending radially outward from an outer surface 164 of the collar 160 over the outward surface 72 and beyond the seal cavity 86 and thereby increasing the length of the labyrinth leading to the seal cavity 86. The flange 162 includes a plurality of circumferentially spaced apertures 166 there through to allow relatively small sized material and debris to flow into and, more critically, out of the seal cavity 86. As shown, the apertures 166 may be aligned with the entrance to the seal cavity 86 defined by the outer surface 164 of the collar 160 and the outward surface 72 of the carrier roller 36. Alternatively, the apertures 166 may be radially positioned on the flange 162 inwardly or outwardly to offset the apertures 166 from the seal cavity 86 if necessary to produce a desired flow of material from the seal cavity 86.

The apertures 166 may be provided in varying sizes, and do not necessarily need to be round as illustrated herein. For example, the apertures 166 may be radial slots, circumferential slots, squares, triangles or any other desired geometric configuration to facilitate the flow of material out of the seal cavity 86. The illustrated apertures 166 have a generally constant diameter there through, but the apertures 166 may also be tapered or countersunk with a minimum diameter proximate the outward surface 72 and seal cavity 86, and a maximum diameter at the outward side of the collar 160 opposite the seal cavity 86. The tapering of the apertures 166 may restrict the flow of material through the apertures 166 into the seal cavity 86, while at the same time promote the flow of material out of the seal cavity 86. The extended flange 162 and the apertures 166 of the collar 160 allow material such as mud and dirt that inevitably accumulate to exit the seal cavity 86, while preventing larger materials, strings, wire, video cassette tape, plastic bags and the like that create a greater risk of damage to the seals 78, 84 from entering the seal cavity 86.

Figure 12:
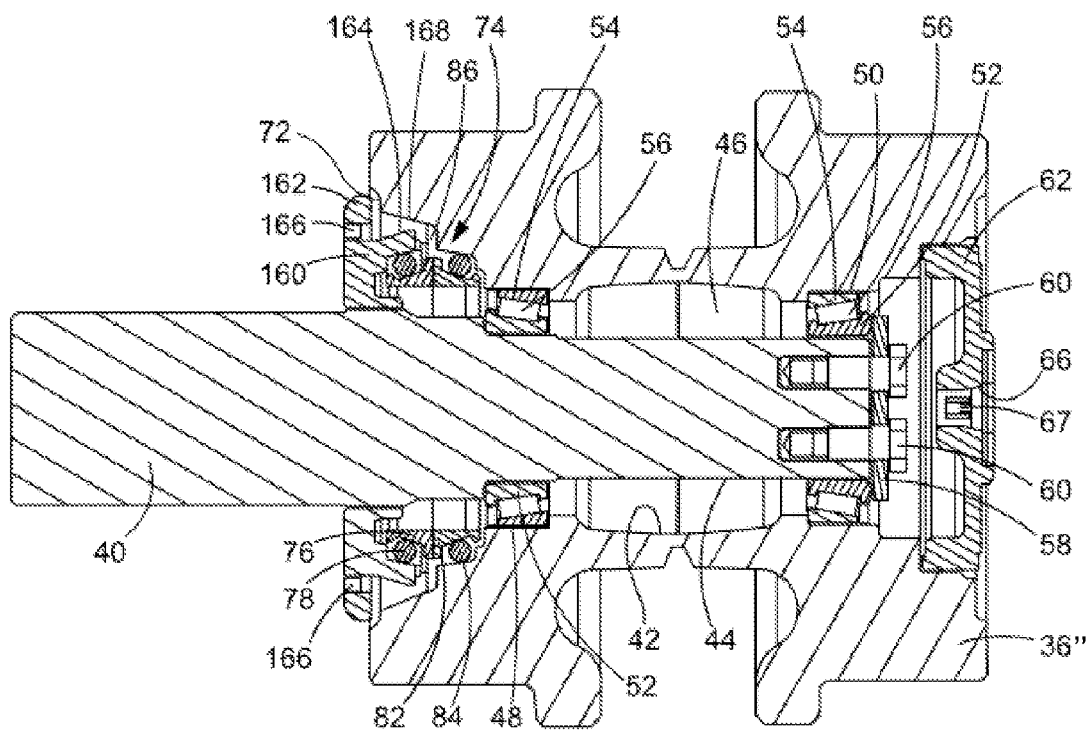
FIG. 12 is a cross-sectional view of the track carrier roller of FIG. 6 taken through line 7-7 with an alternative embodiment of the inner surface of the carrier roller.

The outer surface 164 of the collar 160 may be similarly configured to produce a desired flow of material into and out of the seal cavity 86. As shown, the outer surface 164 may be tapered from a maximum outer diameter proximate the seal cavity 86 to a minimum outer diameter proximate the flange 162. With this geometry of the outer surface 164, the gap between the outer surface 164 and the outward rim 72 increases as the outer surface 164 extends from the seal cavity 86 toward the flange 162 to encourage flow of material out of the seal cavity 86. As shown in FIG. 12, a portion 168 of the outward rim 72 radially aligned with the outer surface 164 may be tapered in a manner opposite the outer surface 164 from a minimum outer diameter proximate the seal cavity 86 to a maximum outer diameter proximate the exterior of a carrier roller 36". The tapering of the portion 168 of the outward rim 72 further facilitates the flow of material out of the seal cavity 86 in general. Moreover, the downward slope of the portion 168 proximate the lower end of the carrier roller 36" allows loose material to feed out of the seal cavity 86 under the force of gravity before mud, water or other cohesive medium aggregates the material within the seal cavity 86. Of course, those skilled in the art will understand that tapering of the outer surfaces of the collars and corresponding portions of the outward rims as shown in FIGS. 7 and 12 may be implemented in any of the embodiments illustrated herein or other implementations of seal packing guards, the implementation of which is contemplated by the inventors.

Figure 8:
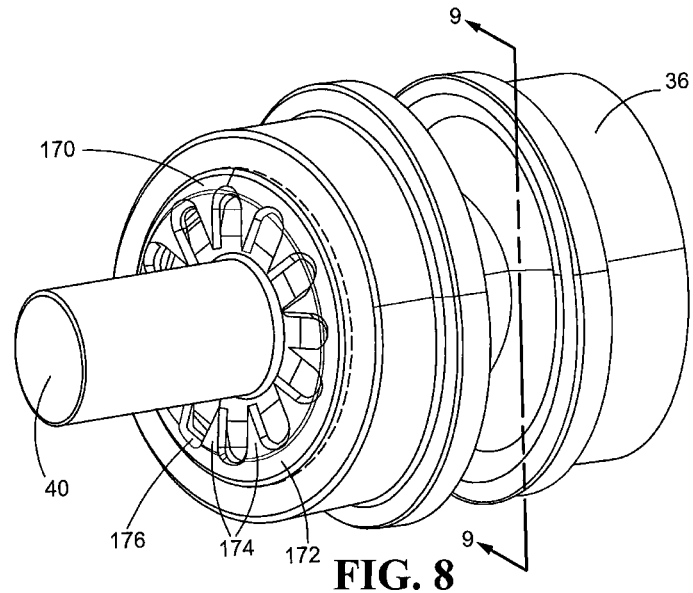
FIG. 8 is an isometric view of the track carrier roller of FIG. 2 with a further alternative embodiment of a seal packing guard.
Figure 9:
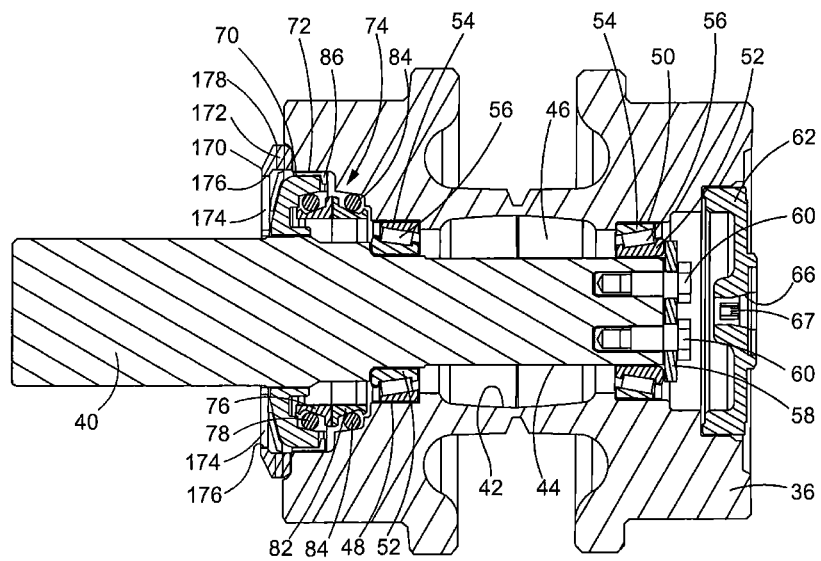
FIG. 9 is a cross-sectional view of the track carrier roller of FIG. 8 taken through line 9-9.

FIGS. 8 and 9 illustrate a further alternative embodiment of a seal packing guard 170 in accordance with the present disclosure that may have particular application in mud packing environments in retarding the build-up of compacted material in the seal cavity 86. The seal packing guard 170 shown in FIGS. 8 and 9 includes an annular outer ring 172 connected to the second outward rim 72 of the carrier roller 36, and a plurality of circumferentially spaced fingers 174 extending radially inwardly from an annular inner surface 176 of the outer ring 172 so that the fingers 174 overlay the gap between the outer surface 70 and the outward rim 72 forming the channel leading to the seal cavity 86. The outer ring 172 includes an annular outer surface 178 having an outer diameter, and the annular inner surface 176 has an inner diameter. The outer ring 172 is secured to the outward rim 72 by welds, bolts, adhesive or other appropriate fastening mechanisms. The outer ring 172 and the fingers 174 are dimensioned so that the fingers 174 are disposed axially outward beyond the collar 68 so that the fingers 174 do not engage the collar 68 as the carrier roller 36 and, correspondingly, the seal packing guard 170 rotate about the shaft 40 during use.

The fingers 174 may have any appropriate geometry to scrape or otherwise divert material from entering the seal cavity 86 as the carrier roller 36 and seal packing guard 170 rotate. In the illustrated embodiment, each of the fingers 174 has a generally triangular shape that tapers from a relatively wide base of the triangle at the inner surface 176 of the outer ring 172 to a point at an inward end of the finger 174. Each of the fingers 174 may also have chamfered perimeter edges tapering inward from the side facing the collar 70 to the outward side of the finger 174 to assist in diverting material away from the gap between the outer surface 70 and the outward rim 72. The space between adjacent fingers 174 of the seal packing guard 170 may be dimensioned large enough to allow egress from the seal cavity 86 for material that flows in past the scraping fingers 174 during rotation of the carrier roller 36.

Figure 10:
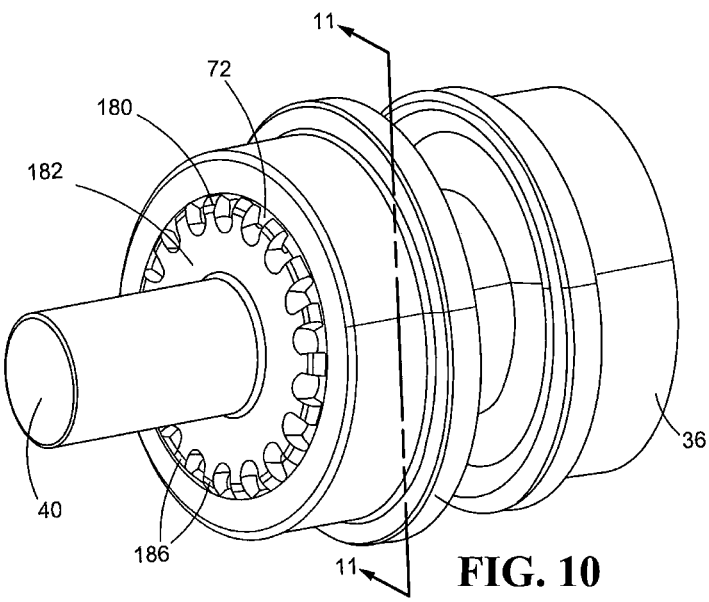
FIG. 10 is an isometric view of the track carrier roller of FIG. 2 with a still further alternative embodiment of a collar functioning as a seal packing guard.
Figure 11:
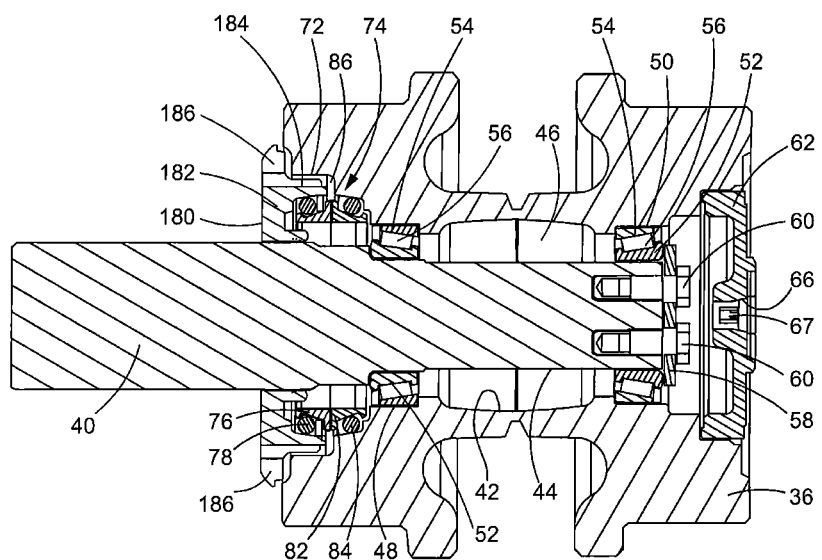
FIG. 11 is a cross-sectional view of the track carrier roller of FIG. 10 taken through line 11-11.

The concept of the scraping fingers 174 as described above may be implemented in the collar without the necessity of a separate seal packing guard component being attached to the roller assembly. As shown in FIGS. 10 and 11, a collar 180 may include an annular disk 182 having an outer surface 184 forming a gap with the outward rim 72 leading to the seal cavity 86. A plurality of circumferentially spaced teeth 186 may extend outwardly from the outer surface 184 of the collar 180 such that the teeth 186 overlay the gap between the outer surface 184 and the outward rim 72. The teeth 186 may have any appropriate shape to facilitate scraping of material as the carrier roller 36 rotates past the teeth 186, such as a triangular shape that tapers from a relatively wide base at the outer surface 184 of the collar 180 to a point at an outward end of the tooth 186, or a relatively constant width as the tooth 186 extends from the outer surface 184 to an outward end of the tooth 186. Each of the teeth 186 may also have chamfered perimeter edges tapering inward from the side facing the outward rim 72 to the outward side of the tooth 186 to create a scraping edge causing the scraped material to flow away from outward rim 72. Though not shown, the outer surface 184 and the corresponding radially aligned portion of the outward rim 72 may be tapered as described with regards to FIGS. 7 and 12 to further promote the flow of material out of the seal cavity 86.

Figure 13:
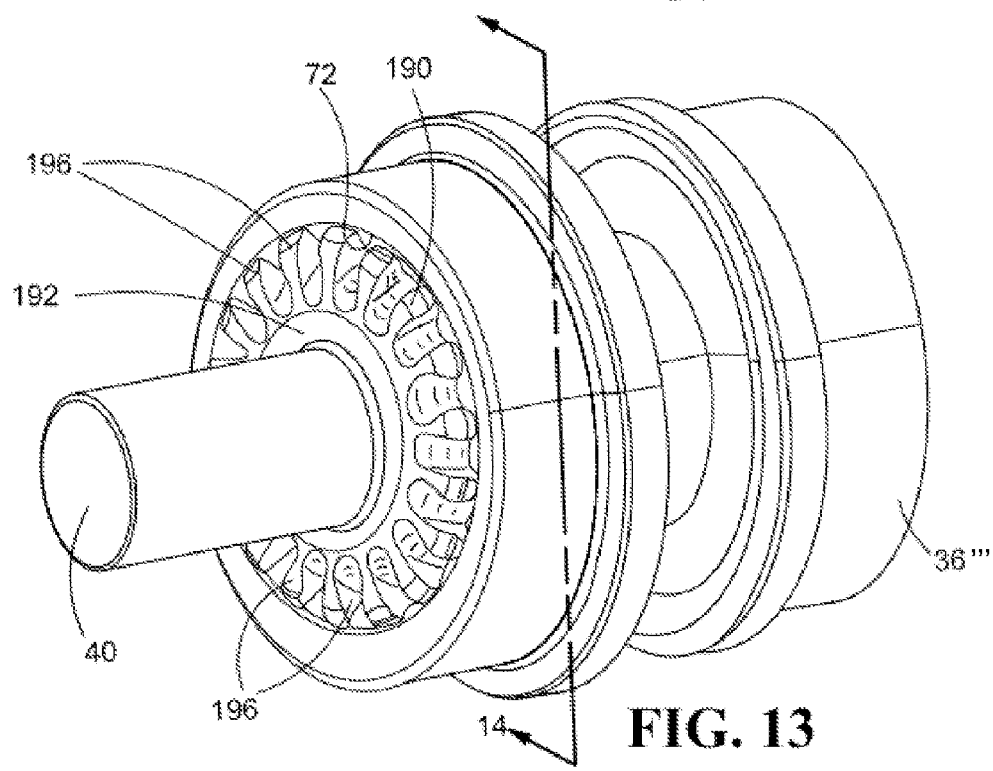
FIG. 13 is an isometric view of the track carrier roller of FIG. 2 with another alternative embodiment of a collar functioning as a seal packing guard.
Figure 14:
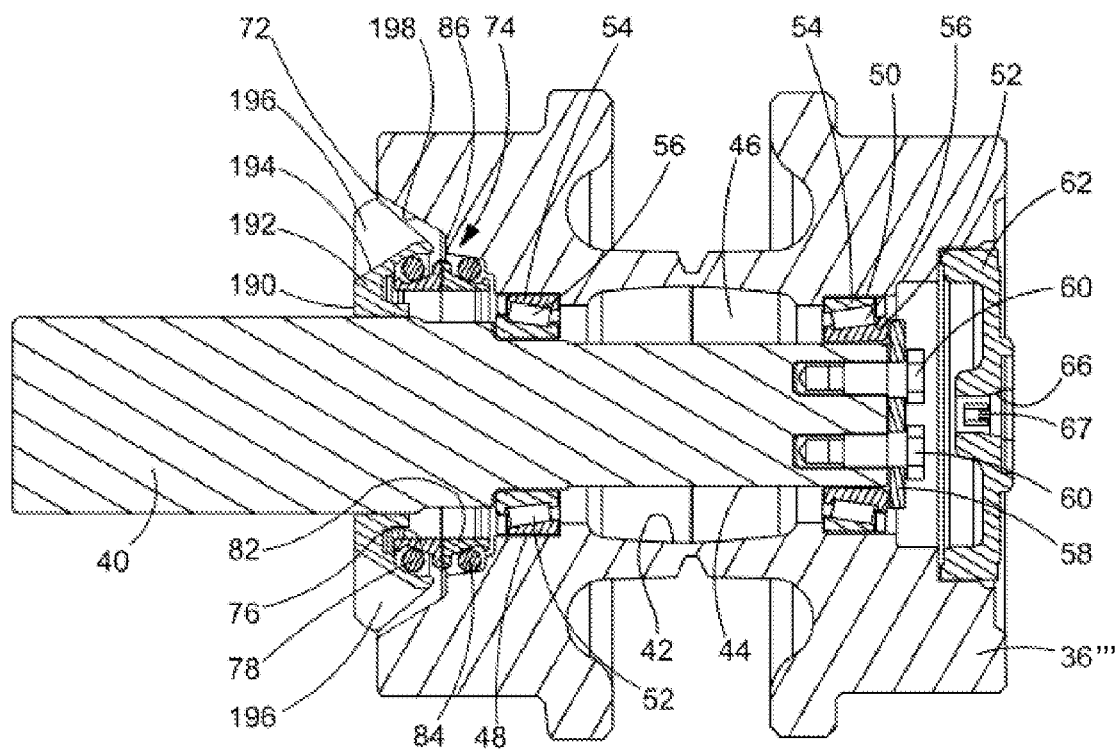
FIG. 14 is a cross-sectional view of the track carrier roller of FIG. 13 taken through line 14-14.
Figure 15:
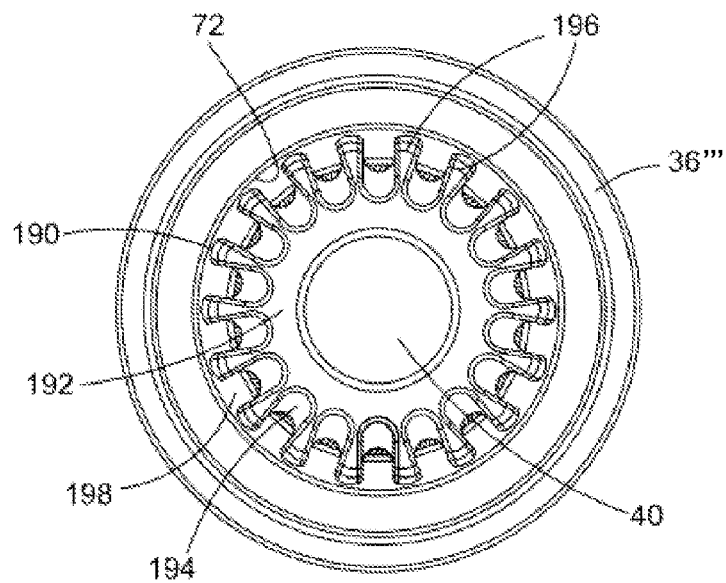
FIG. 15 is a front view of the track carrier roller of FIG. 13.

FIGS. 13-15 illustrate a modification of the embodiment of FIGS. 10 and 11 providing improved flow of material out of the seal cavity 86. Similar to the collar 180 of FIGS. 10 and 11, a collar 190 may include an annular disk 192 having an outer surface 184 forming a gap with the outward rim 72 leading to the seal cavity 86. A plurality of circumferentially spaced teeth 196 may extend outwardly from the outer surface 194 of the collar 190 such that the teeth 196 overlay the gap between the outer surface 194 and the outward rim 72. The outer surface 194 of the collar 190 is configured to produce the desired flow of material into and out of the seal cavity 86 by being tapered from a maximum outer diameter proximate the seal cavity 86 to a minimum outer diameter at an outward side of the annular disk 192. A portion 198 of the outward rim 72 radially aligned with the outer surface 194 is tapered in a manner opposite the outer surface 194 from a minimum outer diameter proximate the seal cavity 86 to a maximum outer diameter proximate the exterior of a carrier roller 36'''. The complimentary tapering of both the outer surface 194 and the outward rim 72 further facilitates the flow of material out of the seal cavity 86, and the downward slope of the portion 198 of the outward rim 72 proximate the lower end of the carrier roller 36''' allows loose material to feed out of the seal cavity 86 under the force of gravity. The teeth 196 may have chamfered perimeter edges as discussed above. Additionally, as shown more clearly in FIG. 15, the teeth 196 may have a reverse triangular shape that widens from a relatively narrow base at the outer surface 194 of the collar 190 to a relatively wide outward end. Dimensioned as shown, the facing edges of adjacent teeth 196 may be approximately parallel. Of course, other relative orientations of the facing edges of adjacent teeth 196 will be apparent and are contemplated by the inventors.

INDUSTRIAL APPLICABILITY

The seal packing guards 90, 120, 170 and the configurations of the carrier rollers 36, 36', 36'', 36''' and collars 68, 160, 180 disclosed herein serve to prolong the useful life of the carrier rollers 36, 36', 36'', 36''' by protecting the seal cavity 86 from the adverse affects of engagement by compacted abrasive materials. The arrangements of the seal packing guards 90, 120 impede the accumulation of compacted material within the seal cavity 86 due to the proximity of the seal packing guard 90 to the carrier stand 38 and roller shaft 40. The increased lengths of the seal cavity 86 provided by the seal packing guards 90, 120 function to forestall the impingement of the compacted material on the seals 76, 84 that causes premature displacement of the seals 76, 84 or abrasion of the seals 76, 84 resulting in leakage of the lubricant and premature failure of the carrier roller 36, 36', 36'', 36'''.

The complimentary geometries of the outer surface 140 of the collar 68 and the inner surface 142 of the outward rim 72 of the carrier roller 36, 36', 36'', 36''' similarly prolong the useful life of the carrier roller 36, 36', 36'', 36''' by increasing the distance to be traversed by the abrasive material to reach the seal cavity 86. Additional complimentary geometries are possible and contemplated for increasing the distance to the seal cavity 86 while allowing the collar 68 to be inserted into the outward rim 72 without interfering with the rotation of the carrier roller 36, 36', 36'', 36''' about the roller shaft 40. Moreover, though not explicitly illustrated herein, the seal packing guards 90, 120 may be implemented in conjunction with the geometries of the surfaces 140, 142 to establish labyrinths having more complexity and distance for the abrasive material to traverse before impacting and compacting around the seals 76, 84.

The collars and/or seal packing guards may also be configured to allow benign types of material to flow into and out of the seal cavity 86 while preventing more destructive materials from entering the seal cavity 86 and engaging the seals 78, 84. Small materials may flow into and out of the seal cavity 86 past the collars 70, 160, 180 and seal packing guard 170. However, larger materials and objects such as wire, string, video cassette tape, plastic bags and the like that can get bound up in the seal cavity 86 are prevented from passing through to the seal cavity 86. By restricting and, for some materials, preventing passage into the seal cavity 86, the integrity of the seals 78, 84 may be preserved longer in the embodiments disclosed herein than for previously know rotating components, such as carrier rollers, track rollers, idler pulleys, sprockets and the like, without seal packing guards and collars managing the material flow through the seal cavities 86.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A roller assembly, comprising
a roller shaft;
a roller rotatably mounted on the roller shaft with a first end of the roller shaft extending beyond a roller outward surface that is an axially outermost surface of the roller, the roller and the roller shaft defining a lubricant reservoir there between, and with the roller outward surface of the roller defining an outward rim of the roller, wherein the outward rim comprises an annular inner surface extending axially inwardly from the roller outward surface of the roller and having at least two inner diameter portions each having an inner diameter, wherein the inner diameter for one of the inner diameter portions is less than the inner diameter of an adjacent inner diameter portion that is more proximate the roller outward surface of the roller;
an annular seal disposed proximate the first end of the roller shaft and between the roller and the roller shaft and forming a substantially water-tight seal of the lubricant reservoir; and
an annular collar disposed on the first end of the roller shaft and received in the outward rim of the roller, the annular collar comprising an annular outer surface extending axially inwardly from a collar outward surface that is an axially outermost surface of the annular collar and having at least two outer diameter portions each having an outer diameter wherein the outer diameter for one of the outer diameter portions is less than an outer diameter of an adjacent outer diameter portion that is axially more proximate the collar outward surface of the annular collar, wherein each of the at least two outer diameter portions of the annular outer surface corresponds to one of the at least two inner diameter portions of the annular inner surface of the outward rim, the outward rim of the roller and the annular outer surface of the annular collar define a seal cavity placing the annular seal in fluid communication with an ambient atmosphere surrounding the roller, and the at least two inner diameter portions and the at least two outer diameter portions define a labyrinth from the ambient atmosphere to the seal cavity and the annular seal.

2. The roller assembly of claim 1, wherein the at least two inner diameter portions of the annular inner surface comprises three inner diameter portions and the at least two outer diameter portions of the annular outer surface comprises three outer diameter portions.

3. The roller assembly of claim 1, wherein the annular inner surface of the outward rim comprises a transition portion between each pair of adjacent inner diameter portions having a planar surface, and wherein the annular outer surface of the annular collar comprises a transition portion between each pair of adjacent outer diameter portions having a planar surface.

4. The roller assembly of claim 3, wherein the planar surfaces of the transition portions of the annular inner surface and the annular outer surface are perpendicular to the roller shaft.

5. The roller assembly of claim 1, comprising a seal packing guard comprising:
   a first annular guard portion having an inward surface connected to the outward surface of the roller and extending axially outwardly from the inward surface to an outward surface beyond an outer surface of the annular collar, the first annular guard portion having an annular inner surface with an inner diameter that is greater than an outer diameter of the annular outer surface of the annular collar, and
   a second annular guard portion connected to the first annular guard portion and having an inner surface with an inner diameter that is greater than an outer diameter of the outer surface of the roller shaft proximate the first end, and is less than the outer diameter of the annular outer surface of the annular collar, and the second annular guard portion having an inward surface defining, in cooperation with the outer surface of the annular collar, a seal cavity extension in fluid communication with the seal cavity.

* * * * *